United States Patent [19]

Lomas

[11] Patent Number: 4,923,834
[45] Date of Patent: May 8, 1990

[54] SIDE MOUNTED COOLERS WITH IMPROVED BACKMIX COOLING IN FCC REGENERATION

[75] Inventor: David A. Lomas, Arlington Heights, Ill.

[73] Assignee: UOP, Des Plaines, Ill.

[21] Appl. No.: 325,268

[22] Filed: Mar. 17, 1989

[51] Int. Cl.$^5$ .................. B01J 38/30; B01J 38/32; B01J 29/38; C10G 11/18

[52] U.S. Cl. .................. 502/41; 208/164; 422/144; 502/44

[58] Field of Search .................. 502/41–44; 208/164

[56] References Cited

U.S. PATENT DOCUMENTS

| | | | |
|---|---|---|---|
| 2,463,623 | 3/1949 | Huff | 23/288 |
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,596,748 | 5/1952 | Watson et al. | 252/417 |
| 2,735,802 | 2/1956 | Jahnig | 196/52 |
| 2,862,798 | 12/1958 | McKinney | 23/288 |
| 2,873,175 | 2/1959 | Owens | 23/288 |
| 2,970,117 | 1/1961 | Harper | 252/417 |
| 4,238,631 | 12/1980 | Daviduk et al. | 585/469 |
| 4,353,812 | 10/1982 | Lomas et al. | 252/417 |
| 4,396,531 | 8/1983 | Lomas | 252/417 |
| 4,439,533 | 3/1984 | Lomas et al. | 502/6 |
| 4,615,992 | 10/1986 | Murphy | 502/41 |

*Primary Examiner*—Paul E. Konopka
*Attorney, Agent, or Firm*—Thomas K. McBride; John G. Tolomei

[57] ABSTRACT

The duty of a side-mounted, backmix type catalyst cooling zone is increased by having one conduit that delivers catalyst to the top of the cooling zone and another conduit that uses fluidizing gas to vent catalyst from the top of the cooling zone back to a regenerator. The catalyst cooling zone is used to cool catalyst in a fluidized catalytic cracking process. The cooling zone comprises a heat exchanger located remote from an FCC regenerator that supplies hot catalyst particles to the cooling zone from a dense phase catalyst bed. Hot catalyst particles enter the top end of the cooling zone through a first conduit. Fluidizing gas, added to the cooling zone for backmixing and heat transfer purposes, exits the top of the cooling zone through a second conduit that communicates the top of the cooler with a dilute phase catalyst zone in the regenerator. Gas flow into and through the second conduit transports catalyst from the cooling zone to the regenerator. In order to minimize any flow of fluidizing gas up the first conduit, a gas collection zone can be maintained in the upper end of the cooling zone.

3 Claims, 1 Drawing Sheet

U.S. Patent
May 8, 1990
4,923,834
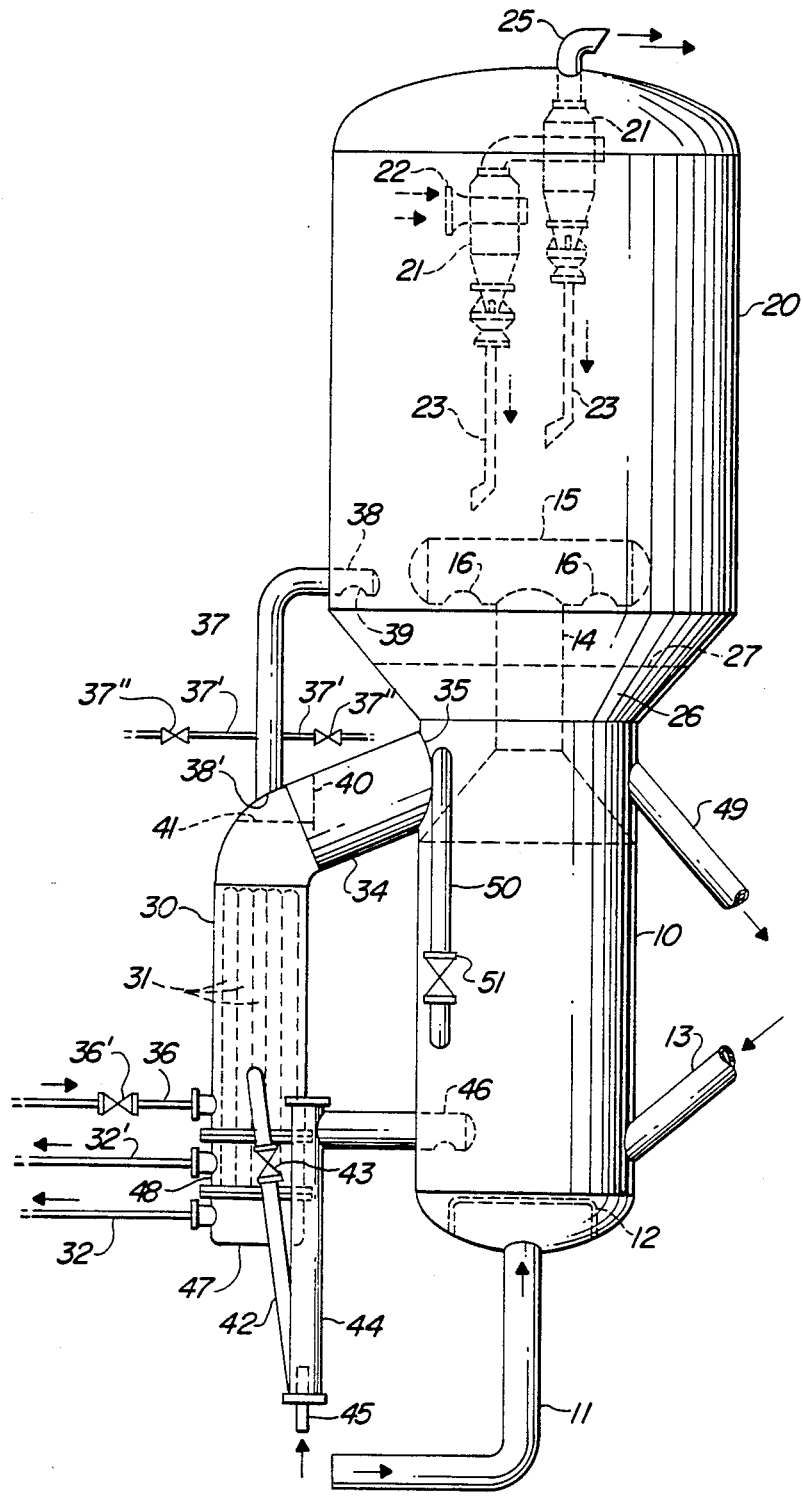

SIDE MOUNTED COOLERS WITH IMPROVED BACKMIX COOLING IN FCC REGENERATION

BACKGROUND OF THE INVENTION

1. Field of the Invention

The field of art to which this invention pertains is the cooling of fluidized particles. It particularly relates to the combustion of combustible material from a particulated solid such as fluidizable catalyst which has been at least partially deactivated by the deposition thereon of a combustible material, such as coke and the cooling of such particles in a vessel that is separate and distinct from the vessel in which such combustion takes place. The present invention will be most useful in a process for regenerating coke-contaminated particles of fluidized cracking catalyst, but it should find use in any process in which combustible material is burned from solid, fluidize particles.

DESCRIPTION OF THE PRIOR ART

The fluid catalyst cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Coke-contaminated catalyst enters the regenerator and is contacted with an oxygen contained gas at conditions such that the coke is oxidized and a considerable amount of heat is released. A portion of this heat escapes the regenerator with the flue gas, comprised of excess regeneration gas and the gaseous products of coke oxidation. The balance of the heat leaves the regenerator with the regenerated, or relatively coke free, catalyst.

The fluidized catalyst is continuously circulate from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the reaction temperature is by regulating the rate of circulation of catalyst from the regeneration zone to the reaction zone which simultaneously increases the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature.

It has become important for FCC units to have the capablity to cope with feedstocks such as residual oils and possibly mixtures of heavy oils with coal or shale derived feeds.

The chemical nature and molecular structure of the feed to the FCC unit will affect that level of coke on spent catalyst. Generallly speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burned in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure due to an increase in thermal versus catalytic selectivity which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalysts are usually maintained below 1400° F., since loss of activity would be very severe at about 1400°-1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°-1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

The prior art is replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Daviduk et al. U.S. Pat. No. 4,238,631; Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123; Lomas U.S. Pat. No. 4,396,531; Lomas et al. U.S. Pat. No. 4,353,812; and Lomas et al. U.S. Pat. No. 4,439,533. At least one of the above patents (Harper) discloses that the rate of return of the cooled catalyst to the regenerator may be controlled by the regenerator (dense catalyst phase) temperature.

An important consideration in the above FCC processes involving regenerator heat removal is the method of control of the quantity of heat removed. In Harper U.S. Pat. No. 2,970,117 and Huff U.S. Pat. No. 2,463,623, the sole method involves regulation of the rate of flow of regenerated catalyst through external catalyst coolers. This method of heat removal, utilizing external coolers and varying the rate of catalyst circulation through them as the exclusive means of control of the heat exchanger duty, involves the continual substantial changing of the catalyst loading on the regenerator with the associated difficulty or impossibility of maintaining convenient steady state operations. In an improved method of using a remote cooler, disclosed in Lomas et al. U.S. Pat. No. 4,353,812, the heat transfer coefficient across the heat transfer surface is controlled by varying the catalyst density through regulation of fluidizing gas addition. The '812 reference also shows the use of a vent line at the top of the catalyst cooler in addition to a catalyst withdrawal line. U.S. Pat. No. 4,615,992, issued to Murphy, also shows the use of a vent line to transfer relatively catalyst-free gas from the top of a remote catalyst cooler to a regenerator vessel. In both cases the cooler receives a high catalyst flux (catalyst flux is the weight of catalyst flowing through a given cross-section per unit of time) through the standpipe feeding the cooler which prevents a catalyst and air mixture flowing countercurrently up the standpipe. One method of control that has been purposefully avoided in the operation of most heat removal zones is the circulation rate of cooling medium. In order to prevent overheating and possible failure of the cooling tubes, cooling medium usually circulates through the tubes at a high and constant rate. Therefore, the most common form of catalyst coolers uses a net flow of catalyst through the cooler and for this reason is termed a flow through cooler. Heat transfer in these flow through coolers is controlled by regulating the net flow or inventory of catalyst either alone or in combination with regulation of the fluidization gas addition.

The principle of controlling heat removal with fluidizing gas addition is used in Lomas U.S. Pat. No. 4,439,533 to operate what is herein referred to as a backmixed cooling zone. In a backmixed cooling zone, catalyst to be cooled circulates in and out of a cooler inlet opening without a net transport of catalyst through the cooler. The difference between a flow through cooler operation and a backmix cooler operation is that in the backmix operation all of the catalyst circulation into and out of the cooler is through the same opening whereas in a flow through operation catalyst is transported in at least one direction down the length of the cooler. U.S. Pat. No. 2,492,948, issued to C.V. Berger, depicts a catalyst cooler that communicates with the lower portion of an FCC regenerator and superficially resembles a backmix type cooler; however, Berger is really a flow through type cooler since it receives catalyst through an annular opening, transports catalyst down an internal annular passage, transports catalyst up through a heat transfer passage, and ejects catalyst from a central opening. The addition rate of fluidizing gas to the catalyst is the sole variable for controlling the amount of heat transfer in the backmix type cooler. The fluidizing gas addition rate controls the heat transfer coefficient between the catalyst and the cooling surface and the turbulence with the cooler. More turbulence in the backmix cooler promotes more heat transfer by increasing the interchange of catalyst at the cooler opening and increasing the average catalyst temperature down the length of the cooler. A remote backmix cooler has the advantage of a simple design and is readily adapted to most FCC configurations since it requires a single opening between the regenerator and the cooler. Unfortunately, backmix coolers often have the drawback of lower heat transfer duty in comparison to flow through type coolers, especially in the case of backmix coolers that are horizontally displaced from a regeneration vessel.

It has now been recognized that the horizontal displacement of a remote catalyst cooler from a regenerator vessel interferes with the exchange of catalyst across the cooler inlet opening. Furthermore, it has been discovered that the problem of catalyst exchange across the opening for backmix operations of a horizontally displaced catalyst cooler can be overcome by a specific arrangement and use of the catalyst cooler and a valveless catalyst transport line.

SUMMARY OF THE INVENTION

In brief summary, this invention is a method and apparatus for increasing the circulation of hot particles from a dense bed in a regeneration zone to a remote cooling zone that is horizontally displaced from the regeneration zone and operates at least partially in a backmix mode. This invention increases catalyst circulation to the top of the cooler by using fluidizing gas to transfer catalyst from the upper portion of the cooler through a passage that is separate and distinct from the passage supplying hot particles to the cooler thereby increasing heat removal for backmix operations of the cooler. By this invention, heat removal for backmix cooler operations is brought to its highest level with the addition of very little hardware.

Accordingly in one embodiment, this invention is a process for regenerating coke-contaminated fluidized catalyst particles. The process includes the steps of maintaining a first bed of fluidized catalyst, communicating hot catalyst from the first bed across a horizontal distance through a first passage to the top of a vertically-oriented cooling zone, and maintaining particles in the cooling zone as a second bed by passing a fluidizing gas upwardly through the second bed. Heat is withdrawn from the particles in the second bed by indirect heat exchange with a cooling fluid. Fluidizing gas and catalyst are removed from the top of the vertically-oriented cooling zone through a second passage and catalyst is returned from the cooler to the dense phase bed through the second passage.

In another embodiment, this invention consists of an apparatus for regenerating coke-contaminated fluidized catalyst particles. The apparatus includes a regeneration vessel and a vertically-oriented catalyst cooler located remote from the combustion zone. The cooler is of a type having an end closure across at least a portion of the upper end of the cooler and no means for transferring catalyst through the lower end of the cooler. A first passage communicates a first opening in the regeneration vessel with a second opening in the upper end of the cooler so that catalyst is communicated between said cooler and said regeneration vessel. Means are provided within the cooler for adding a variable amount of fluidizing gas to the cooler and maintaining a fluidized catalyst bed therein. A second passage communicates the interior side of the end closure with the regeneration vessel through a third opening located in the regeneration vessel above the first opening.

A highly preferred embodiment of this invention uses the cooling process or apparatus of this invention for the regeneration of catalyst particles in an FCC operation.

Other embodiments of the present invention encompass further details such as process streams and the function and arrangement of various components of the apparatus, all of which are hereinafter disclosed in the following discussion of each of the facets of the invention.

BRIEF DESCRIPTION OF THE DRAWING

The FIGURE is an elevation view of a regeneration apparatus according to one embodiment of the present invention, showing a combustion zone 10, a disengagement zone 20, and a cooling zone (heat exchanger) 30.

The above-described drawing is intended to be schematically illustrative of the present invention and not a limitation thereon.

DETAILED DESCRIPTION OF THE INVENTION

The present invention, in its process aspects, consists of steps for the cooling of fluidized particulate materials. An important application of the invention will be a process for the combustion of a combustible material from fluidized particles containing the combustible material, including the step of introducing oxygen containing combustion gas and the fluidized particles into a combustion zone maintained at a temperature sufficient for oxidation of the combustion material. The combustible material will be oxidized therein to produce the first dense phase fluidized bed of hot fluidized particles which are then cooled by the process of the invention. The above combustion zone may be in dilute phase with the hot particles transported to a disengaging zone wherein the hot particles are collected and maintained as the first bed, or the combustion zone may be in dense phase and in itself comprise the first bed.

Dense or dilute phase conditions refer to the density of the catalyst and gas mixture in various sections of the FCC process. The actual density of the flowing catalyst and gas mixture will be dependent on both catalyst flux and superficial gas velocity. Dense phase conditions will typically refer to conditions greater than 30 lbs/ft$^3$ with dilute phase being less than 20 lbs/ft$^3$. Gas and catalyst mixtures having a density of 20 to 30 lbs/ft$^3$ can be considered either dense or dilute.

In a particularly important embodiment of the invention, there will be included steps for the regenerative combustion, within a combustion zone, of a coke containing FCC catalyst, from a reaction zone, to form hot flue gas and hot regenerated catalyst, disengagement and collection of the hot regenerated catalyst, cooling of the hot regenerated catalyst in a heat removal or cooling zone, and the use of at least a portion of the cooled regenerated catalyst for control of the temperatures of the catalyst returning to the reaction zone. As used herein, the term "hot regenerated catalyst" means regenerated catalyst at the temperature leaving the combustion zone, usually from about 1300° to about 1400° F., while the term "cool regenerated catalyst" means regenerated catalyst at the temperature leaving the cooling zone, the latter of which is up to 200° F. less than the temperature of the hot regenerated catalyst.

The cooling zone may be operated in a complete backmix mode wherein the hot regenerated catalyst is continuously circulated through the combustion zone with no net downward movement of catalyst through the cooling zone or a partial flow through mode so that a portion of the catalyst entering the cooling zone passes through the combustion zone. However, this invention is most advantageous when used in a complete backmix mode with a cooler having a lower end that is completely closed to catalyst flow.

Reference will now be made to the attached drawings for a discussion of examples of the regeneration process embodiment and associated apparatus of the invention. In the FIGURE, regeneration gas, which may be air or another oxygen-containing gas, enters the combustion zone 10 through a line 11, and is distributed by a dome style distribution grid 12. Air leaving the grid mixes with coke-contaminated catalyst entering the combustion zone through a conduit 13. These streams are shown as flowing separately into the combustion zone 10; however, each stream could flow together into a mixing conduit before entering combustion zone 10.

Coke-contaminated catalyst commonly contains from about 0.1 to about 5 wt. % carbon, as coke. Coke is predominantly comprised of carbon, however, it can contain from about 3 to about 15 wt. % hydrogen, as well as sulfur and other materials.

The regeneration gas and entrained catalyst flows upward from the lower part of combustion zone 10 to the upper part thereof in dilute phase. Dilute phase conditions are the most efficient for coke oxidation. As the catalyst/gas mixture ascends within combustion zone 10, the heat of combustion of coke is liberated and absorbed by the now relatively carbon-free catalyst; such catalyst is also refered to as regenerated catalyst.

The rising catalyst/gas stream flows through a riser conduit 14 and impinges upon the top of a lateral conduit 15, which impingement changes the direction of flow of the stream and directs the catalyst and gas mixture through outlets 16. The impingement of the catalyst/gas stream upon the top interior surface of lateral conduit 15 and the change of direction through outlets 16 causes almost all of the hot regenerated catalyst flowing from the combustion zone to disengage from the flue gas and fall to the bottom portion of disengagement zone 20 which comprises a hot particle collection chamber or catalyst collection section. Although zone 20 is referred to as a disengaging zone, this term also embraces the possibility that additional regeneration or combustion may be carried out in this zone. The catalyst collection area of the disengagement zone may be an annular receptacle, as shown, or any other shape appropriate for collecting catalyst particles. Catalyst in the bottom of the collection zone is maintained as a dense fluidized bed 26 having an upper level 27. The gaseous products of coke oxidation and excess regeneration gas, known as flue gas, and a small uncollected portion of hot regenerated catalyst flow up through disengagement zone 20 and enter catalyst/gas separators such as cyclones 21 through an inlet 22. Catalyst separated from the flue gas falls from the cyclones to the bottom of disengagement zone 20 through dip legs 23. The flue gas exits disengagement zone 20 via conduit 25, through which it may proceed to associated energy recovery systems.

With further reference to the FIGURE, the cooler or cooling zone is comprised of a heat exchanger 30 having a vertical orientation, the catalyst present on the shell side of the exchanger and a heat exchange medium, supplied by lines 32 and 32', passing through a tube bundle 31. The preferred heat exchange medium would be water, which, in further preference, would change only partially from liquid to a gas phase (steam) when passing through the tubes. It is also preferable to operate the heat exchanger so that the exchange medium is circulated through the tubes at a constant rate. The tube bundle in the heat exchanger will preferably be of the "bayonet" type wherein one end of the bundle is unattached, thereby minimizing problems due to the expansion and contraction of the heat exchanger components when exposed to and cooled from the high regenerated catalyst temperatures. The heat transfer that occurs is, from the catalyst, through the tube walls, and into the heat transfer medium. The top of the exchanger 30 is in sealed communication with the bottom portion of the disengagement zone through a conduit portion 34 and an opening 35. That portion of conduit 34 which is located immediately above bayonet tubes 31 serves as a closure for the upper end of the cooler. The level of the dense phase catalyst bed in the disengagement zone will be kept above opening 35 so that the catalyst may freely backmix and circulate throughout the inside of the exchanger 30 and the bottom of the disengagement zone. Fluidizing gas, preferably air, is passed into a lower portion of the shell side of heat exchanger 30 via line 36, thereby maintaining a dense phase fluidized catalyst bed on the shell side of the exchanger 30. A valve 36' positioned across line 36 regulates the flow of fluidizing gas. The fluidizing gas effects turbulent backmixing and an exchange of catalyst particles between dense bed 26 and the exchanger.

In order to increase the flow of hot catalyst particles into the upper end of exchanger 30, fluidizing gas is vented from the top of the heat exchanger by a conduit 37 and used to transport catalyst out of the top of the cooler. An inlet end 38' of conduit 37 communicates a catalyst bed at the top of the exchanger with a dilute phase section of disengagement zone 20. Conduit 37 has an outlet end 38 that extends into the dilute phase section of disengagement zone 20 and directs the fluidizing gas and catalyst downward through an opening 39. The conduit 37 increases the catalyst circulation to upper end of the heat exchanger in two ways. First, by eliminating the flow of fluidizing gas along the upper surface of conduit 34, which would occur in the absence of conduit 37 and usually takes the form of large slugs of fluidizing gas. These slugs of fluidizing gas are much different than the discrete bubbles that form in the vertical section of the cooler and are much less efficient in particle mixing interchange than the discrete bubbles. In addition, as the fluidizing gas exits the exchanger through conduit 37, it carries catalyst in from the upper end of the exchanger through conduit 37 and into the dilute phase section of disengaging zone 20. Conduit 37 will transfer catalyst in at least dilute phase, i.e., catalyst at a density of at least 2 lbs/ft$^3$, from the exchanger into zone 20. The type of catalyst transport in conduit 37 will be determined by catalyst flux and superficial gas velocities and will include dense as well as dilute phase catalyst transport. Additional air may be added to the conduit 37 by air inlets 37' to aid and control the transport of catalyst through conduit 37. Valves 37'' are used to regulate the addition of fluidizing gas through conduits 37'. The flow of catalyst through conduit 37 is controlled by varying the density of the catalyst in conduit 37 through regulation of the addition of fluidizing gas. Adding additional fluidizing gas to the conduit 37 increases the catalyst circulation about the upper end of the heat exchanger and allows catalyst circulation to be controlled in conduit 37 to about the same degree that a slide valve can control catalyst flow in a down-flow line. Increasing the flow of hot catalyst particles to the upper end of the heat exchanger raises the catalyst temperature in the lower portions of the heat exchanger. Higher temperature catalyst in lower sections of the heat exchanger increases the heat removal duty of the heat exchanger. In addition, with a higher temperature profile in lower sections of the heat exchanger, longer exchanger lengths can be effectively used to further increase the heat removal capacity.

A baffle 40, extends downwardly from and transversely across an upper section of conduit 34. Baffle 40 extends downward across an upper portion of the cross-section of conduit 34 and is located between the opening to conduit 37 and inlet 35. Baffle 40 further segregates the fluidizing gas leaving the exchanger from catalyst entering the exchanger. Segregation of the fluidizing gas is used to form an interface or an upper bed level 41 between an upper dilute catalyst phase and a lower dense catalyst phase. In this way, baffle 40 forms a compartment to collect fluidizing gas and aid in the transfer of catalyst through conduit 37 thereby minimizing the addition of fluidizing gas via 37'. Segregating the fluidizing gas with baffle 40 keeps fluidizing gas away from the opening 35 thereby increasing the net catalyst flow into the heat exchanger and reducing the required diameter of conduit 34. Although baffle 40 will increase catalyst flow into the heat exchanger, substantial benefits are still obtained by the addition of conduit 37 alone.

Heat exchanger 30 may also be operated with some net downward movement of catalyst. This type of operation is referred to as a flow through mode. To the degree that the exchanger is operated in the flow through mode, cool catalyst is withdrawn from a lower portion of exchanger 30 and returned to the combustion zone 10. Catalyst is withdrawn from a lower portion of the exchanger through a conduit 42 having a flow control valve 43. Valve 43 regulates catalyst flow out of conduit 42 and is fully closed when operating the exchanger in a complete backmixed mode. Upon opening valve 43, catalyst flows into an external riser 44. A fluidizing gas, preferably a small portion of the combustion gas, otherwise entering the combustion zone 10 via line 11, enters the bottom of riser 44 through pipe 45 and lifts catalyst from the bottom riser 44 and transports the cool catalyst into combustion zone 10 through riser outlet 46.

The FIGURE shows a preferred embodiment of heat exchanger 30 and the manner of the interconnection of heat exchanger 30 with disengagement zone 20.

Heat exchanger 30 is shown with the shell side having a continuum of dense phase fluidized catalyst that extends out of the cooler and up to a bed level 27. Bed level 27 is well above opening 35 so that there is a constant downward pressure of hydraulic catalyst head urging catalyst into the heat exchanger 30. The fluidizing gas, such as air, which enters the shell through line 36 (fluidizing gas may be introduced at one or more points in the shell in addition to that shown) rises, circulating and backmixing catalyst as it moves upward into conduit 37. Fluidizing gas leaving outlet 39 flows into the disengagement zone where it ultimately leaves the system with the flue gases.

The tube bundle shown is of the aforementioned bayonet type in which the tubes are attached at the bottom or "head" of the heat exchanger 30, but not at any other location. A typical configuration of tubes in the bayonet-type bundle would be one-inch tubes each ascending from an inlet manifold 47 in the head of the exchanger up into the shell of the exchanger through a three inch tube. Each three-inch tube is sealed at its top and each one-inch tube empties into the three-inch-tubes in which it is contained just below the sealed end of the three inch tube. A liquid, such as water, would be passed up into the one inch tubes, would empty into the three-inch tubes, would adsorb heat from the hot catalyst through the wall of the three-inch tubes as it passed downward through the annular space of the three-inch tubes and would exit the heat exchanger, at least partially vaporized, from outlet manifold 48 in the head.

A conduit 49 removes regenerated catalyst from the disengaging zone and delivers it to an FCC reaction zone (not shown). The flow of hot catalyst into the disengagement zone will normally exceed the hot catalyst exit flow requirements via conduit 49. At least a portion of catalyst not exiting via conduit 49 will be circulated to the combustion zone. Shown in the FIGURE is an external conduit 50 and control valve 51 through which the catalyst may pass from the disengagement zone to the combustion zone.

Although the FIGURE illustrates a single heat exchanger with associated circulating catalyst conduit, it should be understood that other configurations are possible, such as two heat exchangers, of the design illustrated, side by side with the conduit 49 between them.

The backmix mode of cooling zone operation as practiced in this invention primarily reduces the temperature of catalyst in the disenaging zone. Therefore, this invention also provides a simple means of cooling catalyst in the disengaging zone 20 with the recycle of catalyst to the combustion zone 10.

It is known that backmixing can be obtained within the heat exchanger at reasonable superficial gas velocities to circulate catalyst between the cooling zone and disengaging zone. The addition of fluidizing gas or air affects the heat transfer coefficient directly by affecting the superficial velocity over the heat exchanger tubes and indirectly by influencing the extent of mass flow of catalyst from the disengagement zone through the heat exchanger. The higher mass flow will also result in a higher heat exchanger duty because the average catalyst temperature in the heat exchanger will be higher thereby providing a higher temperature difference ($\Delta T$) to which the amount of heat transfer is directly proportional. Additional details on the operation of a backmix cooling zone can be found in U.S. Pat. No. 4,439,533. In this invention, the air addition rate also controls the amount of catalyst circulation in conduit 37. Increasing the air addition rate brings more hot catalyst into the cooling zone and further increases the heat exchanger duty.

The following examples demonstrate the increased heat removal capacity that can be obtained by the addition of a conduit and transport air to vent the upper end closure of a catalyst cooler. In both these examples, a regenerator having the general configuration shown in the drawing is operated to regenerate a catalyst with the cooling zone operating in a complete backmix mode (i.e., valve 43 is closed). In both cases, a zeolitic type catalyst having coke in an amount of 0.9 wt. % enters the regenerator combustor at the same rate and at a temperature of 980° F.

EXAMPLE I

This example represents a prior art type process wherein catalyst from the disengaging zone is circulated through the cooling zone via a single conduit. Catalyst enters the combustor where it is contacted with air and regenerated catalyst from the disengaging zone. After combustion of coke in the regeneration zone, the catalyst and spent regeneration gas mixture enters the disengaging zone at a temperature of 1340° F. A portion of the catalyst from the dense bed of the disengaging zone is circulated into a remote cooling zone.

The cooling zone consists of a heat exchanger having bayonet tubes. Air at a rate of 720 SCFM enters the bottom of the heat exchanger. The air travels upward through the exchanger and into the disengaging zone through the same conduit by which the catalyst enters the heat exchanger. Water is circulated through the bayonet tubes at a constant rate to remove heat from the catalyst by indirect heat exchange across the outer surface of the bayonet tubes at a duty of $30 \times 10^6$ Btu/hr.

Catalyst from the cooling zone returns to the dense bed of the disengaging zone. Catalyst is withdrawn from the disengaging zone at an average temperature of 1300° F. for return to a reaction zone and recirculation to the combustion zone.

EXAMPLE II

Example II represents the process of this invention wherein catalyst from a disengaging zone enters a cooling zone through one conduit and fluidizing gas and catalyst in dilute phase is vented from the top of the conduit by another conduit. Again catalyst enters the combustion zone where it is contacted with air and regenerated catalyst from the disengaging zone. After combustion of coke in the combustion zone, the catalyst and spent regeneration gas mixture enters the disengaging zone at a temperature of 1320° F. A portion of the catalyst from the dense bed of the disengaging zone enters a remote cooling zone.

The cooling zone consists of a heat exchanger having bayonet tubes. Air at a rate of 720 SCFM enters the bottom of the heat exchanger. The air travels upward through the exchanger and out of the cooling zone through a conduit that communicates the top of the cooling zone with a dilute phase section of the disengaging zone. Water is circulated through the bayonet tubes at the same rate as Example I to remove heat from the catalyst by indirect heat exchange across the outer surface of the bayonet tubes. In this example, the heat exchanger has a duty of $55 \times 10^6$ Btu/hr. Catalyst from the cooling zone is carried to the dilute phase section of the disengaging zone. Catalyst is withdrawn from the disengaging zone at an average temperature of 1270° F.

for return to the reaction zone and recirculation to the combustion zone.

A comparison between the two examples demonstrates the advantages of this invention. By the addition of a single conduit for communicating the top of the cooling zone with the disengaging zone, the cooler duty was increased 83.0%. The only additional cost associated with obtaining this benefit is the relatively minor cost of the conduit. The fluidizing gas for transporting catalyst from the cooling zone to the disengaging zone did not add any cost since the air rate to the cooling zone was the same in Examples I and II.

What is claimed is:

1. A process for regenerating fluidized cracking catalyst for use in a catalytic cracking reaction zone said process comprising:
   (a) introducing an oxygen-containing regeneration gas and coke-contaminated fluidized catalyst into a first bed of catalyst in a combustion zone maintained at a temperature sufficient for coke oxidation and therein oxidizing coke to produce hot regenerated catalyst and hot flue gas;
   (b) transporting said hot flue gas and said hot regenerated catalyst from said combustion zone into a regenerated catalyst disengaging zone, wherein said hot regenerated catalyst is separated from said flue gas and forms a second bed of catalyst in a lower portion of said disengaging zone;
   (c) withdrawing regenerated catalyst from said second bed and transporting said regenerated catalyst to said fluidized catalytic cracking reaction zone;
   (d) communicating catalyst from said second bed through a first passage across a horizontal distance into a third bed of catalyst located at the top of a remote and vertically-oriented cooling zone;
   (e) passing a fluidizing gas upwardly through said cooling zone, and said third bed and maintaining a dense catalyst phase, having a density greater than 20 lb/ft$^3$ in said cooling zone and said third bed;
   (f) operating said vertically-oriented cooling zone in an at least partial backmix mode to exchange catalyst between said third bed and said cooling zone and remove heat from said catalyst by indirect heat exchange with a cooling fluid in said cooling zone and produce relatively cool regenerated catalyst in said cooling zone and said third bed; and
   (g) withdrawing a mixture of fluidizing gas and catalyst, having a density of at least 2 lb/ft$^3$ from said third bed at a location below the top of said second bed through a second passage and returning particles from said second passage to said second bed.

2. The process of claim 1 wherein said cooling zone operates in a complete backmix mode and said first and second passages are the only means for transferring catalyst into or out of said cooling zone.

3. A process for regenerating fluidizing cracking catalyst for use in a catalytic cracking reaction zone said process comprising:
   (a) introducing an oxygen-containing regeneration gas and coke-contaminated catalyst into a fluidized regeneration zone maintained at a temperature sufficient for coke oxidation and therein oxidizing coke to produce hot regenerated catalyst and hot flue gas;
   (b) separating said hot flue gas and said hot regenerated catalyst in a regenerated catalyst disengaging zone located above said catalyst fluidizing regeneration zone and forming a first bed of catalyst in said disengaging zone.
   (c) withdrawing regenerated catalyst from said first bed and transporting said regenerated catalyst to said fluidized catalytic cracking reaction zone;
   (d) communicating catalyst from said first bed through a first passage across a horizontal distance into a second bed of catalyst located at the top of a remote and vertically-oriented cooling zone;
   (e) passing a fluidizing gas upwardly through said cooling zone, and said second bed, and maintaining a dense catalyst phase having a density greater than 20 lb/ft$^3$ in said cooling zone and said second bed;
   (f) operating said vertically-oriented cooling zone in a complete backmix mode to exchange catalyst between said second bed and said cooling zone and remove heat from said catalyst by indirect heat exchange with a cooling fluid in said cooling zone and produce relatively cool regenerated catalyst in said cooling zone and said second bed; and
   (g) withdrawing a mixture of fluidizing gas and catalyst, having a density of at least 2 lb/ft$^3$ from said second bed at a location below the top of said first bed through a second passage and returning particles from said second passage to said first bed.

* * * * *